April 12, 1949.

M. O. SMITH 2,466,973

QUALITY GRADER

Filed March 16, 1948

INVENTOR
MARION O. SMITH

BY Philip A. Minnis
Hans G. Hoffmeister
ATTORNEYS

April 12, 1949. M. O. SMITH 2,466,973
QUALITY GRADER
Filed March 16, 1948 2 Sheets-Sheet 2
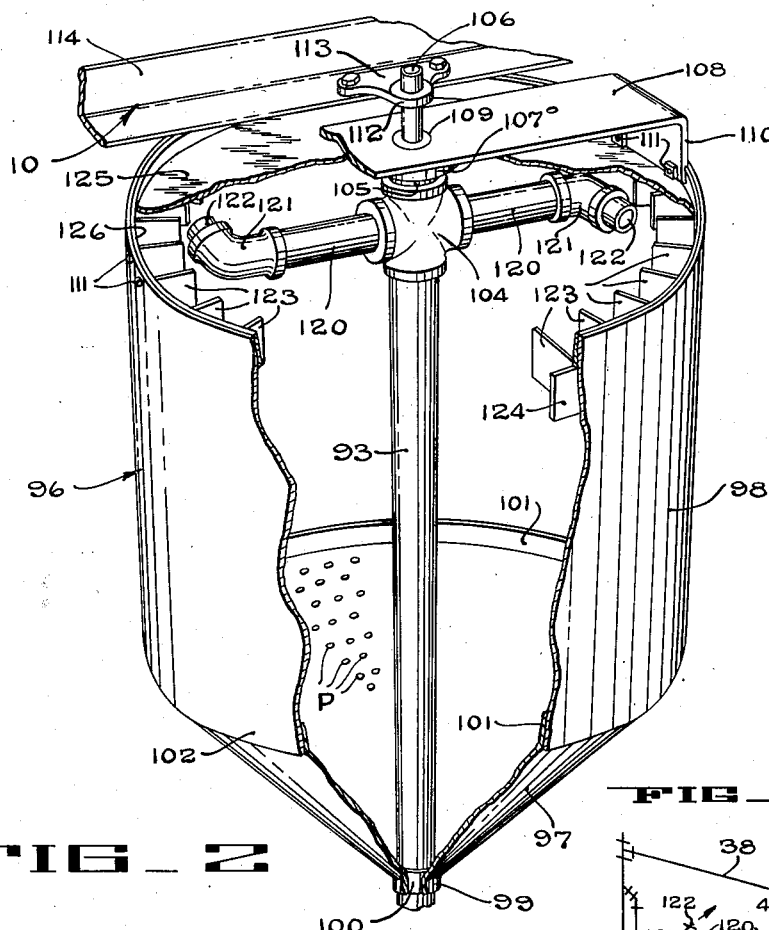
INVENTOR
MARION O. SMITH Patented Apr. 12, 1949

2,466,973

UNITED STATES PATENT OFFICE 2,466,973

QUALITY GRADER

Marion O. Smith, Hoopeston, Ill., assignor to Food Machinery and Chemical Corporation, a corporation of Delaware Application March 16, 1948, Serial No. 15,189

8 Claims. (Cl. 209—173)

This invention relates to quality graders and more particularly to improvements in apparatus for separating peas or the like in accordance with their quality as determined by their differences in specific gravity.

The invention is especially concerned with improvements in graders of the general type disclosed in the patent to Kerr 2,355,735 granted August 15, 1944, wherein brine solution is directed through a raceway between spaced concentrically disposed inner and outer walls to provide a whirling pool of brine solution having a spirally and upwardly flowing current. In such apparatus, peas which have been previously graded for size and usually blanched are deposited into the whirling pool of brine solution in which tender peas rise to the surface of the brine solution and are carried thereby to a discharge point where they are skimmed off while the hard peas sink and are drawn off at the bottom of the pool.

It is apparent that eddy currents tend to develop adjacent the inner wall of such a raceway unless the inner wall moves in unison with the whirling pool of brine. With eddy currents prevailing in the whirlpool, the lighter peas are likely to be held within the solution to such extent as to become saturated with brine and, therefore, will sink or be drawn off with the sinkers resulting in a loss of a portion of the choice product.

In the apparatus of the Kerr patent, the inner wall is influenced to rotate by the hydraulic action of the whirling pool of brine to thereby minimize development of eddy currents along the inner wall of the raceway.

While rotation of the inner wall by a hydraulic action of the whirling pool of brine has been satisfactory under normal operating conditions, when a batch of peas having a greater percentage of heavier peas than lighter ones is introduced into the brine solution, the heavier peas sink with such rapidity or sometimes the peas collect at the bottom of the rotatable inner wall to such an extent as to retard rotation of the inner wall of the raceway and sometimes may even cause its stoppage, thereby defeating the very purpose for which it was intended.

The present invention contemplates overcoming the possibility of stoppage or retardation of rotation of the inner wall of the raceway due to any resistance offered by the sinking peas, and, accordingly, it is a general object of this invention to provide an improved grading apparatus for peas, or the like.

Another object is to provide a grading apparatus in which the inner wall of its raceway is induced to rotate independently of, but in substantial unison with, the whirling pool of brine solution bearing the product to be separated.

Another object is to provide a quality grading apparatus in which the rotatable inner drum is positively driven.

Another object is to provide a hydraulically driven inner drum for a quality grader in which the hydraulic effect of the driving liquid will tend to drive the product to be separated away from the base of such drum.

Other objects and advantages of the present invention will become apparent from the following description and drawings in which:

Fig. 2 is a perspective view of a portion of the grading apparatus shown in Fig. 1.

Fig. 3 is a horizontal section taken along line 3—3 in Fig. 1.

Fig. 4 is a diagram illustrating the fluid input system of the grading apparatus.

Figure 1:
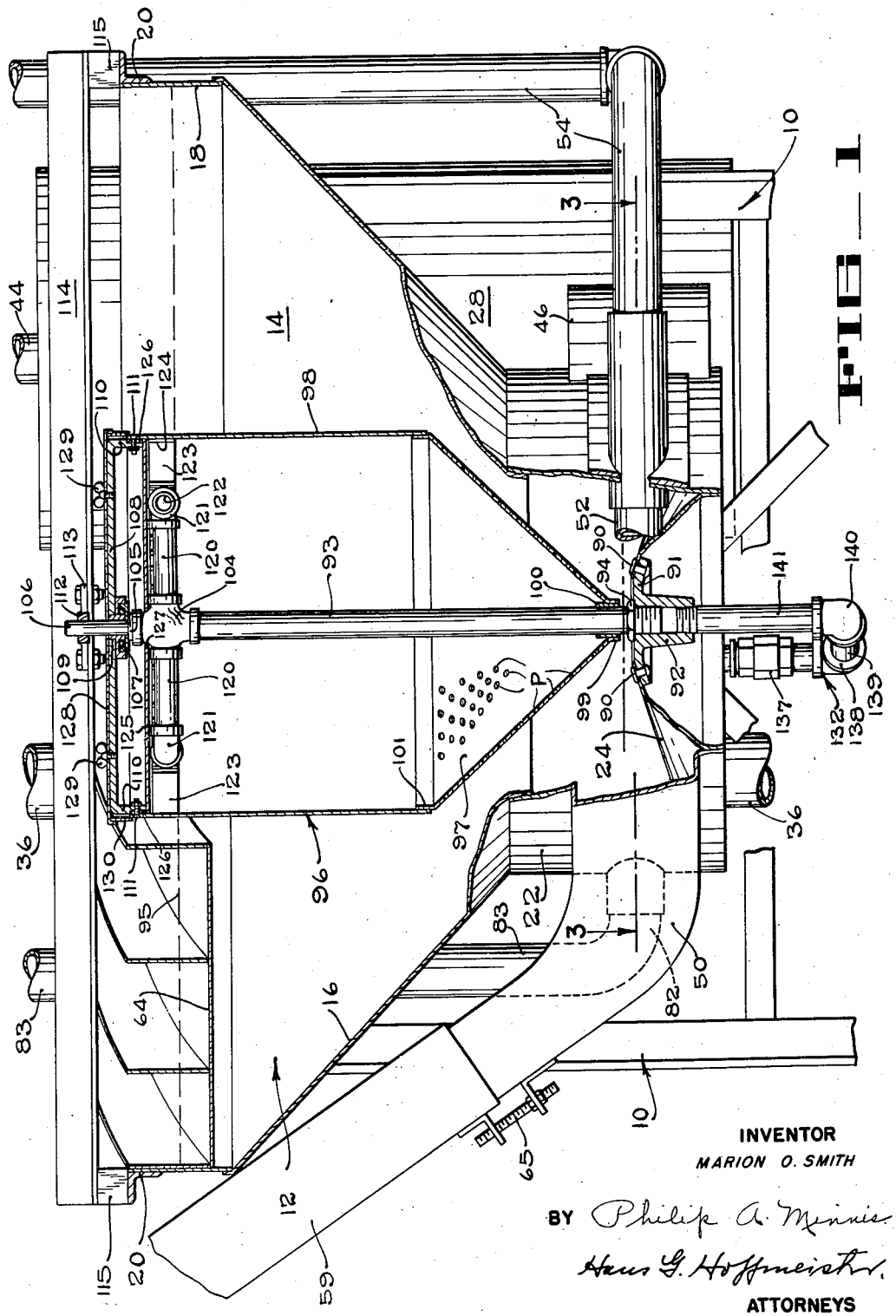
Fig. 1 is a vertical transverse section, partly in elevation, of an apparatus for grading peas.

For purposes of simplicity the present invention has been disclosed in connection with a quality grader similar to the one shown in the aforementioned Kerr patent, only so much of the latter being shown as is deemed necessary to a clear understanding of the present invention. For further details of construction of graders of this type reference may be had to the above named Kerr patent.

Referring to the drawings, in which similar numerals indicate similar parts throughout the several views, 10 (Fig. 1) is a frame structure supporting a circular separating or settling tank 12, in which is maintained a body of separating solution 14, customarily a brine solution of proper specific gravity for the particular operation. The tank 12 consists of a central inverted frusto-conical section 16, to the upper end of which is secured, as by welding, a cylindrical rim portion 18 having a peripheral angle stiffening bar 20. A second cylindrical extension 22 having an inverted dish-shaped bottom 24 is welded to the lower end of the central section.

Adjacent the separating tank 12 and supported by the frame 10 is a cylindrical reservoir 28 open at the top and substantially equal in height to the tank 12. The reservoir 28 receives solution from the discharge side of a pump 30 (Fig. 4) which draws the solution from a source, not shown, through a pipe 32. The pump may be driven through suitable means, for instance, an electric motor, not shown, so as to discharge the brine into a vertical supply pipe 36 which, in turn, is connected to a transversely extending pipe 38. The pipe 38 terminates above the reservoir 28 in a T fitting 40, the vertical branch of which connects with a valve 42 having an outlet 44 in the reservoir 28. Brine flows from the bottom of the reservoir 28 through a square inlet conduit 46 into the separating tank 12. The inlet conduit is attached tangentially to the lower cylindrical section 22 of the tank, as seen in Fig. 3, so that the brine enters the bottom of the separating tank in a whirling current, as indicated by the arrows 48 in this figure.

A square discharge conduit 50 through which some of the whirling brine may discharge is provided for conducting the harder peas or sinkers out of the separating tank. This conduit is also tangentially connected to the section 22 of the tank 12, but at 90° to the conduit 46. In order to assist the discharge of the sinkers through the conduit 50 an additional discharge current is provided. Thus, a nozzle 52 projects into the separating tank tangentially to the section 22 and in line with and centrally of the discharge conduit 50 to inject a small body of liquid under pressure in the direction indicated by the arrows 53 in Fig. 3. It has been found that a small body of liquid flushes out the sinkers better than a large body and with less agitation to the grading liquid. The nozzle 52 connects through a pipe line 54 with a horizontal branch of the T fitting 40. A valve 56 is provided for adjusting the rate of flow of liquid from this nozzle. The sinker discharge conduit 50 extends upwardly and discharges the sinkers and their conveying brine into a hopper or chute, not shown, through an adjustable conduit 59 having a spout, not shown. The height of the outlet of the spout determines the fluid level in the separating tank 12 in a manner well known in the art.

The peas to be graded are deposited from above into the tank 12 at one side thereof (right side Fig. 1). In order to remove the tender peas floating on the surface or near the surface of the brine in the separating tank 12, an adjustable skimming plate 64 is provided. In practice, the spout 59 of the sinker discharge conduit 50 is adjusted by the screw 65 to a height to obtain the desired fluid level in the separating tank 12 so that there will be an adequate overflow of brine at the point of discharge, not shown, of the skimming plate 64 to carry the tender peas away from the separating tank to a suitable collection device, not shown.

The brine solution 14 upon being admitted by the conduit 46 into the lower section 22 of the separating tank creates a circular current that flows spirally and upwardly through the conical and upper sections of the separating tank where it overflows at the discharge point of the skimming plate 64. In order to control rotation of the brine and to give it added impetus additional fluid is injected tangentially under pressure into the section 22 of the separating tank from an inlet 80 of a pipe 82 having a vertical branch 83 connected to the upper end of the brine supply pipe 36 (Figs. 1 and 4). A valve 84 is provided in the pipe 82 to adjustably control the aforesaid booster action.

As shown in Fig. 3, the brine is injected from the inlet 80 in the direction of the arrows 86, the established flow of the current therefrom and from the conduit 46 being indicated by the arrows 88. It will be understood that the liquid not only has a circular flow in the separating tank but because of the constant overflow at the discharge point of the skimming plate, the current also flows spirally and upwardly through the conical and upper section of the separating tank 12.

The inverted dish shaped bottom 24 of the tank 12 is open at its apex and is secured by rivets 90 in a liquid tight manner to a frusto conical flange 91 of a threaded pipe fitting 92. The fitting 92 is vertically disposed concentrically of the tank to receive the threaded lower end of a pipe shaft 93. The pipe shaft 93 is locked in place upon the fitting 92 by a check nut 94 and extends upwardly within the tank 12 to the liquid level 95 adjacent to the upper rim of the tank.

Positioned centrally of the tank 12 upon the pipe shaft 93 is a drum or central baffle generally designated 96. The drum 96 is preferably made of sheet metal and comprises a lower conical portion 97 and an upper cylindrical portion 98. The conical portion is provided with perforations P and is provided with a lower cylindrical flange 99 which is silver soldered to a bearing sleeve 100 which fits around the pipe shaft 93.

The conical portion 97 of the drum has a cylindrical upper flange 101 which is secured by welding, or the like, to the lower margin 102 of the cylindrical portion 98 of the drum. The upper cylindrical portion 98 of the drum extends substantially above the liquid level 95 in the tank 12 and above a cross fitting 104 which is threaded to the upper end of the pipe shaft 93.

The upper opening of the cross fitting 104 is closed by a plug 105 provided with an upright pin 106 having a thrust bearing 107 mounted thereon with its lower race resting upon the plug 105. The upper race of the bearing 107 supports a cross strap 108 having an opening 109 for centering the strap with respect to the upstanding hub of the bearing 107. The ends 110 of this cross strap 108 are bent downwardly to fit within the upper rim of the drum 96 and are secured to the same by bolts 111 for suspending the drum from the upper end of the pipe shaft.

The pin 106 extends upwardly from the plug 105 into a boss 112 of a plate 113 which is secured to a horizontal angle iron rail 114. The rail 114 has a vertical strut 115 secured to each of its ends, which struts are secured to the peripheral angle 20 at the upper rim of the tank 12.

From the foregoing, it will be apparent that the pipe shaft 93 is supported in an erect position concentrically of the tank 12. The drum 96 hangs from the ends of the strap 108 which is supported for rotation upon the thrust bearing 107, the lower end of the drum being maintained in vertical alignment with the tank 12 by the bearing sleeve 100 which surrounds the pipe shaft 93. Consequently, the drum 96 is suspended for rotation concentrically of the tank 12 and provides a revolvable inner wall for the circular raceway through which the brine solution flows.

It should be noted that the periphery of the drum presents a plain inner wall for the raceway, i. e., free of any projections or obstructions capable of creating any eddy currents adjacent the same.

Extending from the lateral openings of the cross fitting 104 are pipe arms 120 each provided with a right angle elbow 121 having its discharge opening facing horizontally and in a direction opposite to the discharge opening of the other elbow 121, each elbow discharging within the drum 96 in the general direction of the flow of the brine solution exteriorly thereof. The discharge opening of each elbow 121 is provided with a short nozzle 122 adapted to direct a stream of liquid against radially disposed vanes or fins 123, each of which has its base flange 124 secured by spot welding to the inner wall of the drum.

The fins 123 are disposed in an annular row above the liquid level 95 and the number of fins employed and their spacing is such that liquid discharging from the nozzles 122 will effect continuous rotation of the drum 96 concurrent with the whirling brine solution in tank 12. It will be noted that the drum is provided with a baffle or cover 125 having its upturned flange 126 fitting within the inner wall of the drum and secured thereto simultaneously with the upper rim of the drum by the bolts 111 hereinbefore referred to. The baffle 125 has a central opening 127 which fits around the upper arm of the cross fitting 104 so as to overlie the fins 123 to prevent splashing of the liquid above the fins and into the thrust bearing as well as the grading pool surrounding the drum.

The upper end of the drum 96 is further enclosed by a lid 128 which rests upon and is secured by thumb nuts 129 to the cross strap 108. The lid 128 is provided with an outer flange 130 which extends downwardly to the upper rim of the drum so as to completely close the same to prevent peas from lodging in the upper end of the drum.

Referring to Figs. 1 and 4, it will be noted that the pipe shaft 93 is in communication with the vertical supply pipe 36 by a system of piping 132. This system of piping includes a T fitting 133 in the supply pipe 36 having a lateral pipe 134 connected thereto. The pipe 134 has an elbow 135 at its opposite end connected to a valve 136 by a suitable nipple. The opposite side of valve 136 is connected by a nipple to a union 137 communicating with an elbow 138 connected to a lateral pipe 139 in turn connected by an elbow 140 to a vertical pipe 141. The vertical pipe 141 has its upper end threaded into the lower threaded opening of the pipe fitting 92 in alignment with the pipe shaft 93.

The foregoing arrangement provides a means for supplying brine under pressure to the pipe shaft 93 for discharge through its associated nozzles 122 for hydraulically driving the drum 96 independently of the hydraulic action of the whirling pool of brine within the tank 12. Moreover, the rate of flow of brine from the supply pipe 36 can be controlled by adjustment of the valve 136 to vary the speed of rotation of the drum 96 to suit the particular conditions prevailing within the tank 12.

By this arrangement, the drum 96 is positively rotated within, and in unison with, the whirling pool of brine solution to thereby prevent eddy currents from developing adjacent the inner wall of the raceway. Consequently, regardless of the tendency of peas to collect around the base of the drum, rotation of the drum will not be impeded and efficient separation of the peas will be assured.

As hereinbefore pointed out, the lower conical portion 97 of the drum is perforated and, consequently, the brine which enters the drum by way of the nozzles 122 will flow downwardly within the drum and exit through the perforations P in the cone portion thereof and flow into the lower region of the tank 12. The brine solution discharged from the drum will thus merge with the whirling pool of brine in the tank and the current of the brine flowing through the perforations P in the drum will tend to drive peas away from the base thereof and thereby aid in preventing undue collection of peas around the base of the drum. This will materially assist the operation of the apparatus in that the peas will be maintained in the stream of the whirling pool of brine and the sinkers will freely move toward the perimeter of the lower section 22 of the tank 12 for discharge by way of the discharge conduit 50.

While the particular structure herein described is well adapted for carrying out the objects of the present invention, it will be understood that various modifications, changes, and substitutions may be made without departing from the spirit thereof. I, therefore, desire to avail myself of all modifications, changes, and substitutions as may come within the purview of the appended claims.

What I claim as new and desire to protect by Letters Patent is:

1. In an apparatus for grading peas or the like including a circular tank for supporting a body of liquid directed into the same in a manner to effect a whirlpool therein, a drum projecting downwardly into the center of said body of liquid to form an inner wall of an annular raceway for the whirling pool of liquid in said tank, means for supporting said drum for rotation within said tank, a plurality of vanes on the inner wall of said drum, and means for directing a stream of fluid toward said vanes for positively driving said drum in unison with said whirling pool of liquid.

2. In an apparatus for grading peas or the like including a circular tank for supporting a body of liquid directed into the same to effect a whirlpool therein, a drum projecting downwardly into the center of said body of liquid to form an inner wall of an annular raceway within said tank, means for supporting said drum for rotation within said tank, a plurality of vanes formed on the inner wall of said drum, and a plurality of jets within said drum for directing fluid against said vanes for driving said drum in unison with, but independently of, said whirling pool of liquid.

3. In an apparatus for grading peas or the like including a circular tank for supporting a body of liquid directed into the same for effecting a whirlpool, a drum projecting downwardly into the center of said body of liquid to form the inner wall of a raceway therefor, means for supporting said drum for rotation within said tank, said drum having a plurality of fins on its inner wall and a perforated conical lower portion, and means within said drum for directing fluid toward the vanes on the inner wall thereof for driving said drum in unison with said whirling pool of liquid and for discharge through the perforations in the conical lower portion of said drum for driving peas away from the base of said drum.

4. In an apparatus for grading peas or the like including a circular tank for supporting a body of liquid directed into the same to effect a whirlpool therein, a pipe shaft mounted centrally within said drum and extending upwardly therein, a drum mounted for rotation on said pipe shaft for providing an inner wall for an annular raceway within said tank, an annular row of fins on the internal wall of said drum, means for supplying liquid under pressure to said pipe shaft, and means communicating with said pipe shaft for directing fluid toward said fins for rotating said drum independently of the hydraulic effect of said whirlpool of liquid.

5. In an apparatus for grading peas or the like including a circular tank for supporting a body of liquid directed into the same for effecting a whirlpool, a drum projecting downwardly into the center of said body of liquid to form the inner wall of a raceway therefor, a pipe shaft extending upwardly through the bottom of said tank for supporting said drum for rotation therein, a plurality of fins on the inner wall of said drum, a plurality of jets communicating with said pipe shaft and so disposed as to direct a stream of fluid against said fins for rotating said drum, and means for supplying fluid to said pipe shaft.

6. In an apparatus for grading peas or the like including a tank for supporting a body of liquid directed into the same for creating a whirlpool therein, a drum projecting downwardly into the center of said body of liquid and having a perforated lower conical portion terminating in a bearing sleeve, a pipe shaft extending upwardly through said bearing sleeve, means on the upper end of said pipe shaft for supporting said drum for rotation relative thereto, means for supplying liquid under pressure to said pipe shaft, a plurality of fins on the inner wall of said drum, and means communicating with said pipe shaft for directing liquid under pressure toward said fins for rotating said drum and for escape by way of the perforated lower conical portion thereof.

7. In an apparatus for grading peas or the like including a circular tank for supporting a body of liquid directed into the same to effect a whirlpool therein, a pipe shaft mounted centrally within said drum and extending upwardly therein, a drum mounted for rotation on said pipe shaft for providing an inner wall for an annular raceway within said tank, an annular row of fins on the internal wall of said drum, a plurality of jets communicating with said pipe shaft for directing fluid toward said fins, and means for supplying liquid under pressure to said pipe shaft for rotating said drum independently of the hydraulic effect of said whirlpool of liquid, said drum having a perforated bottom portion for permitting escape of liquid from said drum into said body of liquid for preventing collection of peas adjacent said drum.

8. In an apparatus for grading peas and the like comprising a substantially circular tank having a discharge outlet in its lower portion through which liquid may continuously escape, means for introducing liquid into said tank to maintain a body of liquid therein, at least a portion of said liquid being directed tangentially into said tank to rotate said body of liquid in the manner of a whirlpool, a pipe shaft entering said tank from below and extending upwardly therein, a thrust bearing on the upper end of said pipe shaft, a drum suspended from said thrust bearing so as to extend downwardly into the center of said body of liquid to form an inner wall for an annular raceway within said tank, a plurality of fins on the inner wall of said drum, a plurality of jets connected to said pipe shaft for directing fluid toward said fins, and means for conveying fluid under sufficient pressure through said pipe shaft and out of said jets to effect rotation of said drum within said tank.

MARION O. SMITH.

REFERENCES CITED

The following references are of record in the file of this patent:

UNITED STATES PATENTS

| Number | Name | Date |
| --- | --- | --- |
| 1,996,022 | Lewis | Mar. 26, 1935 |
| 2,180,574 | Wood | Nov. 21, 1939 |
| 2,320,335 | Bauer | June 1, 1943 |
| 2,355,735 | Kerr | Aug. 15, 1944 |
| 2,422,657 | Cleveland | June 24, 1947 |